Figure 1:
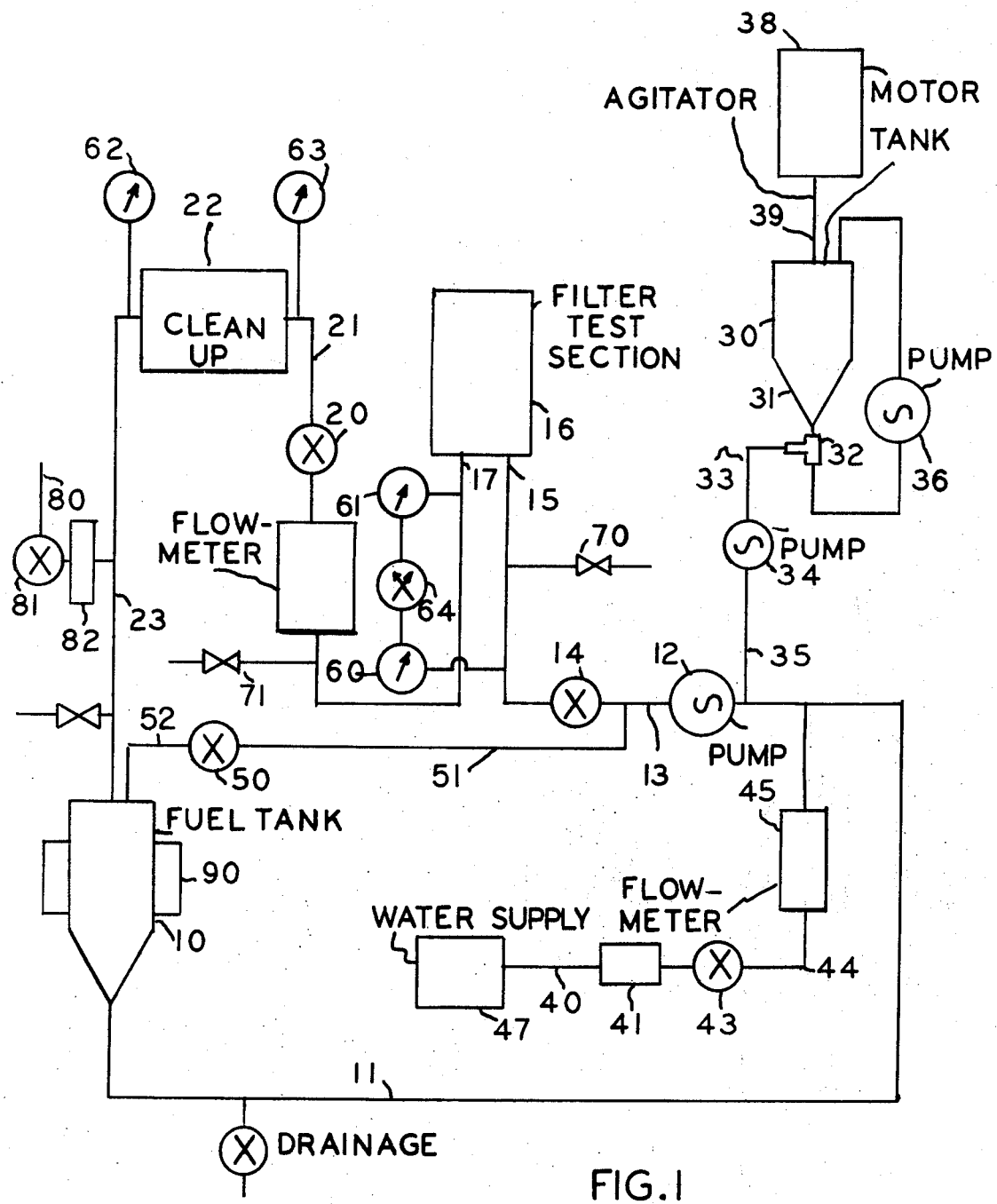

United States Patent [19]
Pontello

[11] 3,824,823
[45] July 23, 1974

[54] FUEL FILTER TESTING APPARATUS
[75] Inventor: Anthony P. Pontello, Springfield, Pa.
[73] Assignee: The United States of America as represented by the Secretary of the Navy, Washington, D.C.
[22] Filed: Feb. 1, 1973
[21] Appl. No.: 328,564

[52] U.S. Cl. .................................. 73/432 R, 73/38
[51] Int. Cl. ............................................ G01m 15/00
[58] Field of Search ............................... 73/38, 432

[56] References Cited
UNITED STATES PATENTS
3,478,601   11/1969   Niebergall .............................. 73/38

*Primary Examiner*—S. Clement Swisher
*Attorney, Agent, or Firm*—R. S. Sciascia; R. J. Miller

[57] ABSTRACT

The invention disclosed herein provides an improved apparatus and system for testing the efficiency of fluid filters by providing an automatic, continuously operating, test apparatus to accurately measure the water and solid contaminants flowing into the fluid or fuel filter and to measure water and contaminants passed therethru.

5 Claims, 1 Drawing Figure

FUEL FILTER TESTING APPARATUS

The invention described herein may be manufactured and used by or for the Government of the United States of America for governmental purposes without the payment of royalties theron or therefor.

The Civil Aeronautics Board (CAB) reported that in a 2 year period 113 air crashes were directly attributable to engine failure caused by contaminated fuel. Fuel filters are being employed in service fuel systems to prevent the refueling of aircraft with contaminated fuel. There is a critical continuing requirement for these filters to also serve as an anti-pollution filter for the reclamation of contaminated (waste) fuel now regarded as a source of environmental pollution. Currently, there is a need for a test method and system to perform qualification tests, evaluations and development tests on these filters. This test system is required to insure that the Navy purchases and installs only those filters capable of providing clean, safe free fuel.

Therefore it is an object of this invention to provide an improved test facility for testing fluid filters for jet fuel.

A further object of this invention is to provide a test apparatus for jet fuel providing controlled input of solid contaminants of minimum and maximum size.

It is yet a further object of this invention to provide a fluid filter test apparatus for testing the efficiency of a fluid filter to remove water contaminants by accurately controlling over a continuous period of time water injected into the fuel which is passed thru the test filter.

It is yet a further object of this invention to provide fluid filters wherein both the solid or water contaminants may be injected into the system and any material contaminants that pass thru to the test filter are removed so that there is continuously provided a clean fluid flow to the point of contaminant injection.

It is yet a further object of this invention to provide an improved test system for testing fluid filters for jet fuels comprising, a test housing for holding a filter to be tested, the housing having input and output connections, a fuel storage tank containing fuel substantially free of contaminants, an input coupling means connecting the fuel storage tank to the input of the housing, output coupling means coupled to receive fuel from the housing and to return the fuel to the fuel storage tank, a water contaminant injection and metering system to inject a variable, determinable amount of water connected to the input side of the housing, a solid contaminant injection system coupled to the input coupling means for injecting solids into the input side of the test section, a fluid pump in the input coupling means for pumping contaminated fuels to the input side of the housing, and means including inlet and outlet pressure gages coupled to the input and output of the housing and input and output samplers connected to the input and output of the housing to continuously monitor the pressure drop across the housing and to continuously measure the input and output contaminants to measure the effeciency of a filter in the test housing.

Other objects, advantages and novel features of the invention will become apparent from the following detailed description of the invention when considered in conjunction with the accompanying drawings wherein:

FIG. 1, an overall schematic diagram of the test equipment utilizing the invention shows a main fuel storage tank 10 that serves as a reservoir during the filter testing process. Input fuel line 11 is coupled to the bottom portion of the fuel tank and provides fuel to a main fuel pump 12. The output of the fuel pump 12 is fed thru line 13, valve 14 to the input side 15 of the filter housing test section 16. Output 17 of the filter housing test section is coupled to line 18 providing fuel flow to a flow meter 19. The output of the flow meter 19 goes via valve 20, line 21 to a cleanup portion 22. Line 23 provides means for returning the fuel to the fuel storage tank 10. This basic portion of the diagram provides a circuit for circulating the fuel to the housing containing the fluid filter to be tested.

Provisions for providing solid contaminants includes a circulating slurry tank 30 having a tapered bottom portion 31 which is connected thru a split "T" 32, line 33, thru a finger pump 34 and line 35 to the fuel storage tank side of the main pump 12.

Additionally split "T" 32 is connected thru line 34 and finger pump 36 and line 37 to tank 30. An air motor 38 drives an agitator 39 in tank 30. The purpose of this system is to provide fuel which contains solid particles in the size range between 0 – 80 microns in a predetermined amount to the test section and to take particles larger than this figure and to provide via the split "T" arrangement for reduction of particle size thru finger pump 36 to recirculate the material until it is the proper size. This system also provides for metering the material into the main line via finger pump 34.

The water contaminant for jet fuel is supplied via water line 40, filter 41, line 42, valve 43, line 44 and flow meter 45.

The automated system provides a continuous water injection system capable of injecting water into the fuel stream between 0 and 10 cc per minute with an accuracy of ±1 percent of any set flow. The water supplied to the system is shown coming from container 47 which provides means of supplying either tap, distilled or salt water for testing these contaminants in the system.

A pressure relief valve 50 coupled by line 51 to line 13 has as its output line 52 exhausting into fuel tank 10. The pressure relief valve 50 is placed in the system before the test filter. Its purpose is to prevent damage to the system in the event the filter becomes overloaded with contaminant closing off the fuel flow which in turn will increase the systems pressures in the fuel lines to a dangerous level. The relief valve is designed to open up at a preset designated pressure to allow for the fuel to return to the main tank and alleviate pressure build-up.

The clay filtration sub-system 22 located in the main fuel system is utilized to improve low quality jet fuels. The rating of jet fuels is based on the water separation index modified (WSIM) numerical readings. These readings are obtained when a sample of fuel is tested in an instrument (water separometer) which measure the water separation characteristics of the test fuel. Readings below 85 for JP-5 fuel and 75 for JP-4 indicate a poor fuel. These are the minimum values for fueling Naval aircraft. The readings on a separometer range from 0 to 100 with values over 90 indicating good quality fuel. If the fuel characteristics used for testing filter is poor (below 75) this indicates the presence of surfactant in the fuel which must be removed to bring the WSIM value about 90. Surfactant may be defined as a contaminant other than water or solids. Through use of by pass valves in the main automated fuel system, the poor quality fuel is circulated through a clay filtration process which removes the surfactant from the fuel and substantially improves the quality. This is an extreme necessity prior to testing fuel filters because low quality fuel could "poison" or disarm a new filter.

A series of pressure gages 60, 61, 62, 63 are provided for measuring pressure of specific points in the automated system. Gage 60, an inlet pressure gage is coupled to measure the pressure at inlet 15. Pressure gage 61 is connected to measure the pressure of outlet 17. Gages 60, 61 are coupled to a differential pressure gage 64 for measuring the pressure drop across the filter section. Inlet pressure gage 63 and outlet pressure gage 62 are connected across the clean up section 22 to provide measurement across that section to determine the status of the clean up section.

A pair of sampler connections 70, 71 are provided to allow the operator of the system to analyze the fuel going in and out of the test filter section 16 to determine its efficiency. A fuel line inlet system 80 includes a valve 81 and a separator 82 to provide a means for charging the fuel tank and system with fuel for running the necessary tests. A cooling unit 90 may be provided, in this instance shown coupled to the fuel storage tank, to keep the fuel at some constant temperature since long term runs may tend to heat the fuel above the operating conditions and give false results.

In operation, clean fuel is circulated thru the system at which time initial pressure readings are recorded. For the water tests the desired percentage of water is then injected into the flowing fuel stream immediately before the fuel pump. The shearing action of the pump create a desired emulsion between fuel and water. Using an in-line sampling system, a 500 meter sample is extracted before and after the test filter. "Before" to insure the correct concentration of water contaminant going in and "after" to record the correct concentration of free water contaminant in the effluent. For the solid contamination tests a slurry of particles sized between 0 and 80 microns in fuel is injected into the system through a finger type pump. The second finger type pump is used to circulate the slurry and keep it agitated.

The inverted split "T" at the bottom of the tank 30 is provided for the heavy particles which fail to mix into the fuel to drop to the bottom of the split "T" and be cycled back into the slurry tank through one of the finger pumps. The action of the fingers on the pump breaks up the heavy particles. The side of the split "T" is used to inject the slurry into the main fuel stream through use of the other finger pump.

Prior to contaminant injection, clean fuel is permitted to circulate through the system and initial pressure readings are recorded. The desired concentration of solid contaminant is then injected into the flowing fuel stream. Using an in-line sampling system, a continuous sample is taken before and after the test filter to determine that the correct concentration is being injected and to determine the concentration of solid contaminant in the effluent.

The sampling process for both the water and solid contaminants and the recording of pressure drop are concluded when the filter becomes loaded with contaminant forcing a cessation in fuel flow and an excessive increase in pressure differential across the filter. These excessive limits varies with the type of fluid filter being tested.

The clean up system contains a series of filters to clean up any contaminants in water and or solids passing through the test filter. There is provided means wherein when the testing of filters is not in progress the fuel flow is bypassed around the test section and is continuously circulated through the clean up section.

In one successful embodiment of the invention the following requirements were placed upon the test equipment.

Automatic equipment needed to control, indicate, and record the flow rate of fuels. (Specific gravity of Jet Fuels: JP–4–0.785 —Flow: 0–25 gpm, or other similar type of liquids JP–5–0.820 — Flow: 0–25 gpm) Accuracy must be within ±10 percent of any set fuel flow between 4 and 20 gallons per minute and must be linear in this range. A square root extractor to linearize equipment signals is authorized. The recording strip chart must be capable of maintaining various speeds such as 5, 10, or 20 inches per hour. This may be done by a jump speed switch and/or changeable gears. Provisions must be made to control flow without the use of the recorder. The automatic flow control system and the strip chart recorder are to be either pneumatically and/or electrically actuated with the former method being preferred where feasible. If electrical equipment is used the servo system shall consist of solid state amplifiers and converters with silicon transistors. The flow measuring elements are to be made of stainless steel or similar material. Flow shall be automatically controlled either by fuel flow control valves or by a motor. This motor shall contain a gear box, with second timing to give a minimum of 300° rotation. Included in the equipment must be a turbine flowmeter with frequency converter capable of delivering 0–10MV linear. The balance speed of this equipment shall not exceed five seconds. Pneumatic actuated equipment shall include an air filter and reducer for a pneumatic system with a recommended air output of 3–15 psig and a maximum air input requirement of 40 psig. All equipment which is to be connected to the fuel system shall be directly adaptable to one inch diameter tubing using threaded or swagelok connections.

Obviously many modifications and variations of the present invention are possible in the light of the above teachings. It is therefore to be understood that within the scope of the appended claims the invention may be practiced otherwise than as specifically described.

I claim:

1. An improved test system for testing fluid filters for jet fuels comprising;
    a. a test housing for holding a filter to be tested, said housing having input and output connections;
    b. a fuel storage tank containing fuel substantially free of contaminants;
    c. an input coupling means connecting said fuel storage tank to said input of said housing;
    d. output coupling means coupled to receive fuel from said housing and to return said fuel to said fuel storage tank;
    e. a water contaminant injection and metering system to inject a variable, determinable amount of water connected to the input side of said housing;

f. a solid contaminant injection system coupled to said input coupling means for injecting solids into the input side of said test section;

g. a fluid pump in said input coupling means for pumping contaminated fuels to said input side of said housing; and h. means including inlet and outlet pressure gages coupled to the input and output of said housing and input and output samplers connected to said input and output of said housing to continuously monitor the pressure drop across said housing and to continuously measure the input and output contaminants to measure the efficiency of a filter in said test housing.

2. The improved test system of claim 1 wherein said water contaminant injection system includes a filter to provide clean water free of contaminants and a flow means to record the amount of water injected into the fuel as a contaminant.

3. The device of claim 1 wherein there is provided in the solid contaminant injection system a storage tank containing fuel and solid contaminants and a slurry, means for pumping said slurry into said fuel and means including a circulating pump for recirculating the slurry within the slurry tank to back up large solid contaminants to the desired contaminant range.

4. The system of claim 3 wherein a pressure relief system is provided between said main pump and said test system to by-pass the fuel when predetermined pressures are reached in the input of said test section.

5. The system of claim 4 wherein a clean up section in the outline of said test section is provided to continuously clean fuel after it passes the filter to be tested so that the main storage tank continuously supplies clean fuel to be injected by pre-determined amounts of contaminant.

* * * * *